United States Patent
Escobar Marin et al.

(10) Patent No.: US 11,584,829 B2
(45) Date of Patent: Feb. 21, 2023

(54) METHODS FOR PREPARING WATERBORNE HEAT SEAL COATING COMPOSITIONS

(71) Applicants: Dow Global Technologies LLC, Midland, MI (US); Rohm and Haas Company, Collegeville, PA (US)

(72) Inventors: Carlos A. Escobar Marin, Midland, MI (US); Amit K. Chaudhary, Midland, MI (US); Yinzhong Guo, Pearland, TX (US); James M. Lipovsky, Upper Holland, PA (US); Ludwik S. Cygan, Downers Grove, IL (US); Liang Chen, Sewickley, PA (US)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 387 days.

(21) Appl. No.: 16/754,435

(22) PCT Filed: Aug. 23, 2018

(86) PCT No.: PCT/US2018/047634
§ 371 (c)(1),
(2) Date: Apr. 8, 2020

(87) PCT Pub. No.: WO2019/089113
PCT Pub. Date: May 9, 2019

(65) Prior Publication Data
US 2020/0392297 A1    Dec. 17, 2020

Related U.S. Application Data

(60) Provisional application No. 62/579,354, filed on Oct. 31, 2017.

(51) Int. Cl.
| | |
|---|---|
| C08J 3/00 | (2006.01) |
| C08K 3/22 | (2006.01) |
| C08K 5/09 | (2006.01) |
| C09D 123/08 | (2006.01) |
| C09D 191/06 | (2006.01) |
| C09D 193/04 | (2006.01) |
| B01F 27/27 | (2022.01) |

(52) U.S. Cl.
CPC ............... *C08J 3/005* (2013.01); *B01F 27/27* (2022.01); *C08K 3/22* (2013.01); *C08K 5/09* (2013.01); *C09D 123/0853* (2013.01); *C09D 191/06* (2013.01); *C09D 193/04* (2013.01)

(58) Field of Classification Search
CPC ... C08J 3/005; C08K 3/22; C08K 5/09; C09D 123/0853; C09D 191/06; C09D 193/04
See application file for complete search history.

(56) References Cited

U.S. PATENT DOCUMENTS

| | | | |
|---|---|---|---|
| 4,320,041 A | 3/1982 | Abe et al. | |
| 5,385,967 A | 1/1995 | Bauer et al. | |
| 5,688,842 A | 11/1997 | Pate, III et al. | |
| 10,442,898 B2 * | 10/2019 | Chen | C09D 123/0853 |

FOREIGN PATENT DOCUMENTS

| | | |
|---|---|---|
| CN | 106221646 A | 12/2016 |
| EP | 1189977 A1 | 3/2002 |
| EP | 1454930 A2 | 9/2004 |
| JP | 2016113507 A | 6/2016 |
| WO | 2007098088 A1 | 8/2007 |
| WO | 2012170241 A1 | 12/2012 |
| WO | 2017024211 A1 | 2/2017 |
| WO | 2017050589 A1 | 3/2017 |
| WO | 2017062088 A1 | 4/2017 |

OTHER PUBLICATIONS

PCT/US2018/047634, International Search Report and Written Opinion dated Oct. 19, 2018.
PCT/US2018/047634, International Preliminary Report on Patentability dated May 14, 2020.

* cited by examiner

*Primary Examiner* — Edward J Cain

(57) ABSTRACT

Methods for preparing waterborne heat seal coating compositions are disclosed, including (A) melt blending an ethylene vinyl acetate copolymer, a tackifier, and a wax in a first mixing apparatus to form a melt blend, (B) contacting the melt blend with an initial aqueous stream comprising a neutralizing agent, water, and a surfactant in an emulsification zone of the second mixing apparatus to form a dispersion, and (C) diluting the dispersion with water in a dilution zone of the second mixing apparatus to form the waterborne heat seal coating composition. Methods for preparing waterborne heat seal coating compositions are also disclosed, including (A) melt blending an ethylene vinyl acetate copolymer, a tackifier, and a wax in a mixing and conveying zone of a mixing apparatus to form a melt blend, (B) contacting the melt blend with an initial aqueous stream comprising a neutralizing agent, water, and a surfactant in an emulsification zone of the mixing apparatus to form a dispersion, and (C) diluting the dispersion with water in a dilution zone of the mixing apparatus to form the waterborne heat seal coating composition, wherein the length-to-diameter ratio of the extruder mixing apparatus is greater than or equal to 12 to 1. Waterborne heat seal coating compositions prepared according to the disclosed methods are also disclosed.

15 Claims, 3 Drawing Sheets

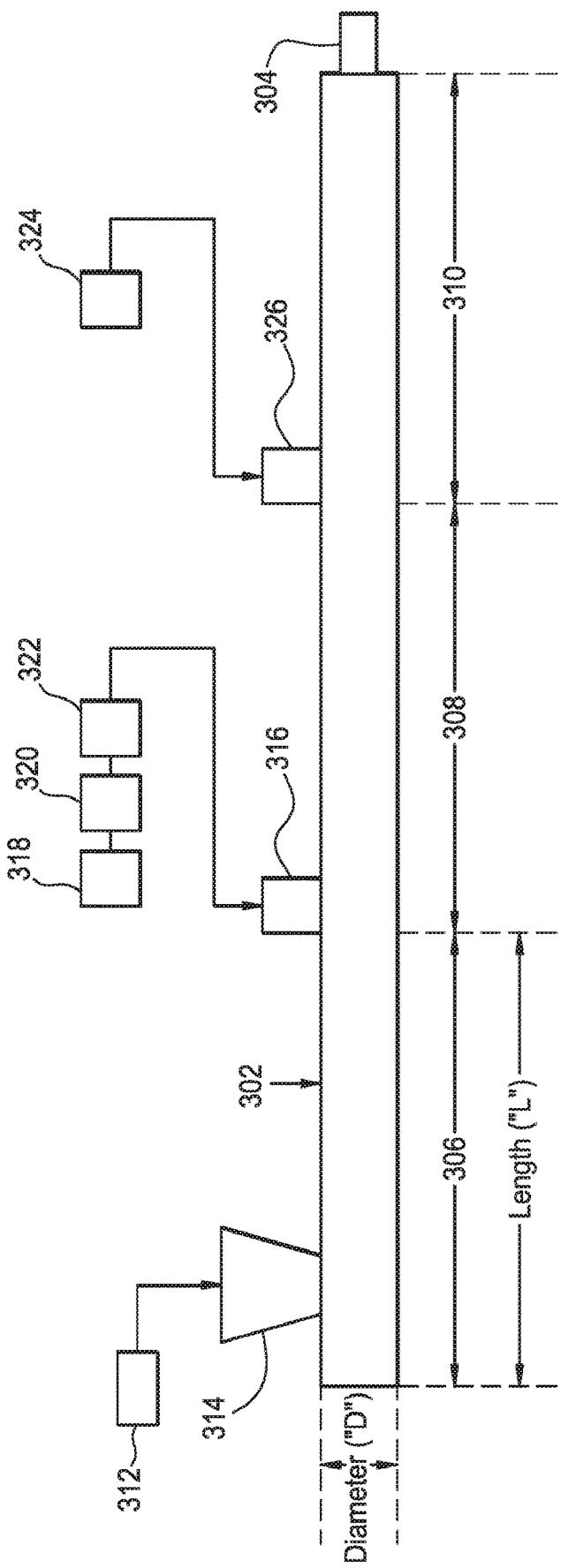

METHODS FOR PREPARING WATERBORNE HEAT SEAL COATING COMPOSITIONS

REFERENCE TO RELATED APPLICATIONS

The present application claims the benefit of U.S. Provisional Application No. 62/579,354, filed on Oct. 31, 2017.

FIELD OF THE DISCLOSURE

The present disclosure relates to methods for preparing waterborne heat seal coating compositions. In particular, the disclosed methods include methods for preparing waterborne heat seal coating compositions that are more efficient and effective than existing methods, while still maintaining or improving waterborne heat seal coating quality and performance.

BACKGROUND AND SUMMARY OF THE DISCLOSURE

Heat seal coatings have been used in food, pharmaceutical, medical, and industrial packaging applications. Examples of heat seal coating products include ethylene vinyl acetate ("EVA") heat seal coatings which can be water-based dispersions based on high molecular weight ethylene interpolymers. Commercially available examples of such water-based products include those sold under the name ADCOTE™ 37 series, available from The Dow Chemical Company.

Waterborne heat seal coating products are typically manufactured by a batch dispersing process, which has relatively high conversion cost due to long cycle time as well as substantial batch-to-batch variations in the produced dispersions. In addition, significant waxes are required as process aids in the batch dispersion process in order to help dispersibility and reduce the melting viscosity of the mixture even though the waxes do not contribute to the adhesion properties. Additionally, the ethylene vinyl acetate resin is likely to be subject to hydrolysis in the batch dispersing process due to longer processing in a strong base environment at high temperature, which will result in degradation of the EVA polymer and performance reduction of heat seal coatings. Accordingly, a continuous dispersion process with short residence time can be preferable to mitigate ethylene vinyl acetate resin hydrolysis.

More recently, and with the limitations of batch processes in mind, waterborne heat seal coatings have been produced by continuous processes in which a single extruder is used to blend, emulsify, and dilute the final dispersion. However, continuous processes have surprisingly encountered scalability issues on large, commercial-scale extruders where the final product is not sufficiently dispersed, i.e., non-uniform dispersion of a narrow particle size distribution, resulting in an unstable dispersion product. This is likely a consequence of the difference in melting temperatures of the raw materials used to produce the dispersions. That is, the lower melting point materials, upon first melting in the extruder at low temperatures, lubricate the pellets of higher melting point materials, thereby preventing the formation of a homogenous mixture of the formulation required for producing a uniform dispersion of a narrow particle size distribution. Accordingly, methods for efficiently and effectively producing a uniform, aqueous dispersion suitable for use in heat seal coating applications, while still maintaining or improving quality and waterborne heat seal coating performance, is desirable.

Methods for manufacturing waterborne heat seal coating products are disclosed. In some embodiments, the methods comprise pre-compounding or pre-mixing at least a portion of the components of the waterborne heat seal coating compositions. For instance, in some embodiments, the disclosed methods comprise (A) melt blending an ethylene vinyl acetate copolymer, a tackifier, and a wax in a first mixing apparatus to form a melt blend, (B) contacting the melt blend with an initial aqueous stream comprising a neutralizing agent, water, and a surfactant in an emulsification zone of the second mixing apparatus to form a dispersion, and (C) diluting the dispersion with water in a dilution zone of the second mixing apparatus to form the waterborne heat seal coating composition.

In some embodiments, the first mixing apparatus is an internal batch mixer, such as a BANBURY™ mixer. In some embodiments, the first mixing apparatus is an extruder, such as a twin-screw extruder. In some embodiments, the second mixing apparatus is an extruder, such as a twin-screw extruder. In some embodiments, the second mixing apparatus is a rotor stator mixer. In still other embodiments, the process is carried out in a single, highly efficient mixing apparatus, such as an extruder, wherein the extruder has particular length-to-diameter ratios to achieve a uniform dispersion.

In some embodiments, the methods for preparing a waterborne heat seal coating composition comprise (A) melt blending an ethylene vinyl acetate copolymer, a tackifier, and a wax in a mixing and conveying zone of an extruder mixing apparatus to form a melt blend, (B) contacting the melt blend with an initial aqueous stream comprising a neutralizing agent, water, and a surfactant in an emulsification zone of the extruder mixing apparatus to form a dispersion, and (C) diluting the dispersion with water in a dilution zone of the extruder mixing apparatus to form the waterborne heat seal coating composition, wherein the length to diameter ratio of the extruder mixing apparatus is greater than or equal to 12 to 1.

Waterborne heat seal coating compositions produced by the methods of the disclosure are also disclosed, as are articles, such as food packaging articles, comprising the disclosed waterborne heat seal coating compositions.

BRIEF DESCRIPTION OF THE DRAWINGS

Reference is made herein to the following Figures, of which:

FIG. 3 shows a schematic illustration of an apparatus including an extended mixing and conveying zone used to prepare waterborne heat seal coating compositions according to the disclosure.

DETAILED DESCRIPTION OF THE DISCLOSURE

Figure 1:
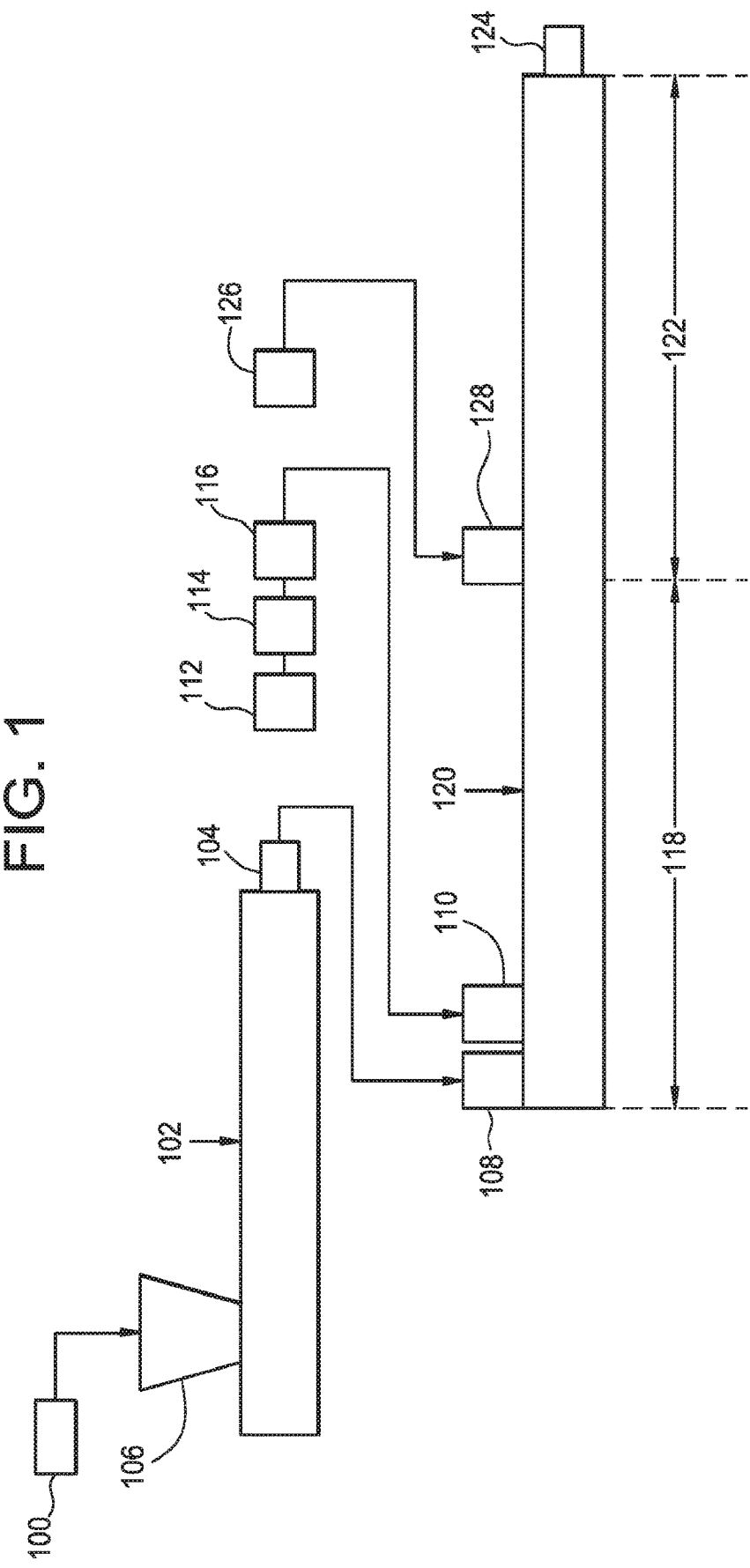
FIG. 1 shows a schematic illustration of an apparatus including a first extruder mixing apparatus and a second extruder mixing apparatus used to prepare waterborne heat seal coating compositions according to the disclosure.

In some embodiments, the waterborne heat seal coating compositions prepared according to the disclosed methods include a thermoplastic polymer. Suitable thermoplastic polymers include a copolymer of ethylene with at least one ethylenically unsaturated comonomer selected from vinyl esters, acrylic acid, $C_1$-$C_4$ alky ester of acrylic acid, $C_1$-$C_4$ alkyl ester of a $C_1$-$C_4$ alkylacrylic acid, and cyclic olefin copolymers and blends thereof. Examples of vinyl esters include vinyl esters of acetic acid, propionic acid, butyric acid, 2-ethylhexane carboxylic acid, pelargonic acid, and stearic acid, particularly $C_2$ to $C_4$-carboxylic acids, and especially vinyl acetate, can be used. Representative examples of copolymers of ethylene and ethylenically unsaturated comonomers include ethylene/vinylacetate copolymer (EVA), ethylene/acrylic acid copolymer (EAA) ethylene/methyl acrylate copolymer (EMA), ethylene/methylmethacrylate copolymer (EMMA), ethylene/methyl acrylate/acrylic acid copolymer (EMAAA), ethylene/methyl acrylate/methacrylic acid copolymer (EMAMAA), ethylene/butyl acrylate/acrylic acid copolymer (EBAAA), and ethylene vinylacetate stryrene compolymers. The polymers can be prepared by bulk, emulsion, gas phase polymerization, or solution polymerization. In various embodiments, the thermoplastic polymer is an ethylene vinyl acetate copolymer. In general, the vinylester content is in the range from 10 to 80 percent, or from 20 to 45 percent, or from 25 to 32 percent, or from 28 to 32 percent by weight. Commercially available examples of ethylene vinyl acetate copolymers comprising 2 to 45 percent by weight of vinyl acetate and having a melt viscosity index of 6 to 150 g/10 min, are sold under the name ELVAX™ from DuPont, such as ELVAX™ 4260.

The thermoplastic polymer in the waterborne heat seal coating composition is generally present in an amount in the range of from 50 to 85 percent by weight, in an amount in the range of from 55 to 80 percent by weight in some embodiments, and in an amount in the range of from 60 to 75 percent by weight in various other embodiments based on the total weight of the solids in the dispersion.

In some embodiments, the waterborne heat seal coating compositions prepared according to the disclosed methods include a tackifier. Any suitable tackifier can be used. Examples of tackifiers include, but are not limited to rosin acid, rosin esters, terpene phenolics, pure monomer resins, and phenolic resins or their mixtures. The tackifiers can be natural products or synthetic products.

The tackifier in the waterborne heat seal coating composition is generally present in an amount in the range of from 5 to 30 percent by weight, or from 6 to 20 percent by weight in some embodiments, or from 10 to 15 percent by weight in various other embodiments based on the total weight of the solids in the composition. Commercially available examples of rosin tackifiers are sold under the name DYMEREX™ from Eastman.

In some embodiments, the waterborne heat seal coating compositions prepared according to the disclosed methods include a wax as an anti-blocking agent. Suitable waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes, fatty acid ester waxes, such as carnauba wax, fatty amide waxes, fluorinated polymer waxes, and combinations thereof. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410, 6,054,544, and 6,723,810, which are all incorporated herein by reference.

In some embodiments, the thermoplastic polymer, the tackifier, and the wax are pre-compounded in a first mixing apparatus prior to entering a second mixing apparatus for dispersion and dilution. In other embodiments, the thermoplastic polymer, the tackifier, and the wax are mixed in a mixing and conveying section of a mixing apparatus having a particular length-to-diameter ratio to form a melt blend prior to entering an emulsification zone and, subsequently, a dilution zone of the same mixing apparatus. In still other embodiments, the wax is heated to a molten state prior to being blended with the thermoplastic polymer and/or tackifier. Additional components of the waterborne heat seal coating compositions are introduced and incorporated into the compositions, as discussed in further detail below.

In addition to the thermoplastic polymer, waterborne heat seal coating compositions described herein include a dispersing agent. As used herein, the term "dispersing agent" means an agent that aids in the formation and/or stabilization of a dispersion. Suitable dispersing agents, sometimes referred to as "surfactants," for use in the present disclosure include both ionic and nonionic surfactants.

Nonionic surfactants are materials in which the polar functionality is not provided by an anionic or cation group, but by a neutral polar group such as typically an alcohol, amine, ether, ester, ketone, or amide function. Nonionic surfactants suitable for use in the disclosed compositions include, but are not limited to, polyethoxylated alkylphenols such as polyethoxylated p-nonylphenol, p-octylphenol, or p-dodecylphenol; polyethoxylated straight-chain alcohols derived from coconut oil, tallow, or synthetic materials including oleyl derivatives; polyethoxylated polyoxypropylene glycols (block copolymers of ethylene oxide and propylene oxide), typically having molecular weights of 1000 to 30,000; polyethylene glycol; polyethoxylated mercaptans; long-chain carboxylic acid esters including glyceryl and polyglyceryl esters of natural fatty acids, propylene glycol esters, sorbitol esters, polyethoxylated sorbitol esters, polyoxyethylene glycol esters, and polyethoxylated fatty acids; alkanolamine "condensates," e.g., the condensates made by reaction of methyl or triglyceride esters of fatty acids with equimolar or twice equimolar amounts of alkanolamine; tertiary acetylenic glycols; polyethoxylated silicones, prepared by reaction of a reactive silicone intermediate with a capped allyl polyalkylene oxide such as propylene oxide or mixed ethylene oxide/propylene oxide copolymer; N-alkylpyrrolidones, and alkylpolyglycosides (long chain acetals of polysaccharides). Further nonionic surfactants more specifically include ethoxylated coco amide; oleic acid; t-dodecyl mercaptan; modified polyester dispersants; ester, amide, or mixed ester-amide dispersants based on polyisobutenyl succinic anhydride; dispersants based on polyisobutyl phenol; ABA type block copolymer nonionic dispersants; acrylic graft copolymers; octylphenoxypolyethoxyethanol; nonylphenoxypolyethoxyethanol; alkyl aryl ethers; alkyl aryl polyethers; amine polyglycol condensates; modified polyethoxy adducts; modified terminated alkyl aryl ethers; modified polyethoxylated straight chain alcohols; terminated ethoxylates of linear primary alcohols; high molecular weight tertiary amines such as 1-hydroxyethyl-2-alkyl imidazolines; oxazolines; perfluoralkyl sulfonates; sorbitan fatty acid esters; polyethylene glycol esters; aliphatic and aromatic phosphate esters. Also included are the reaction products of hydrocarbyl-substituted succinic acylating agents and amines.

Ionic surfactants suitable for use in the disclosed waterborne heat seal coating compositions include, but are not limited to, oleic acid, fatty acid, dimer fatty acid, alkyl solfonic acid, alkyl substituted aromatic solfonic acid, alkyl phosphorus acid, poly(meth)acrylic acid, copolymer of (meth)acrylic acid, and combinations thereof neutralized with an aqueous base. The surfactant can be added to the composition at any point prior to dilution and cooling, which will be discussed in greater detail below.

The surfactant in the waterborne dispersion compositions is generally present in an amount in the range of from 0.1 to 5 percent by weight, in an amount in the range of from 0.2 to 2.5 percent by weight in some embodiments, and in an amount in the range of from 0.5 to 1.5 percent by weight in various other embodiments based on the total weight of the solids in the dispersion.

The surfactant may be partially or fully neutralized with a neutralizing agent. In certain embodiments, neutralization of the stabilizing agent, such as a long chain fatty acid, may be from 25 to 200 percent on a molar basis; or in the alternative, it may be from 50 to 110 percent on a molar basis. For example, for a fatty acid, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may be an organic amine, for example, an amine such as monoethanolamine, or 2-amino-2-methyl-1-propanol (AMP). Amines useful in embodiments disclosed herein may include monoethanolamine, diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

The neutralizing agent in the waterborne dispersion compositions is generally present in an amount in to provide a degree of neutralization to the composition in the range of from 20 to 200 percent, in the range of from 20 to 150 percent in some embodiments, and in an amount in the range of from 25 to 90 percent in various other embodiments based on the total moles of acid of the composition.

The heat seal coating compositions generally comprises greater than 40 percent by weight water, and greater than 50 percent by weight water in various other embodiments.

In some embodiments, the dispersing agent, the neutralizing agent, and the water are added to the waterborne heat seal coating compositions in an emulsification zone of a mixing apparatus.

The heat seal coating compositions may contain other additives including but not limited to defoamers, rheology modifiers, wetting agents, and organic or inorganic pigments.

FIG. 1 shows a schematic illustration of an apparatus which can be used to prepare the waterborne heat seal coatings of the present disclosure. In FIG. 1, a first mixing apparatus 102, for instance a twin screw extruder in FIG. 1, is coupled to a back pressure regulator, melt pump, or gear pump, 104. In other embodiments, any melt-kneading means known in the art may be used as the first mixing apparatus. For instance, in some embodiments, a kneader, a BANBURY® mixer, single-screw extruder, or a multi-screw extruder is used. The thermoplastic polymer, wax, and tackifier are formed or consolidated into a masterbatch, which can be in the shape or form of pellets, powder, or flakes, and fed into feeder 100. The first mixing apparatus melts and blends the pellets, powder, or flakes, which are fed from the feeder 100 to an inlet 106 of the first mixing apparatus 102, to form a homogeneous melt blend under the conditions which are typically used for melt-kneading thermoplastic resins. The melt blend comprises polymer particles having a volume average particle size from 150 nm to 4,000 nm dispersed in water. All values and subranges from 150 nm to 4,000 nm are included herein and disclosed herein. In some embodiments, the first mixing apparatus is operated at a temperature in the range of from 80 to 240° C.

The melt blend is then delivered from the first mixing apparatus 102 to a second mixing apparatus 120, which is an extruder in FIG. 1, via an inlet 108 of the second mixing apparatus 120. The second mixing apparatus includes an emulsification zone 118 and a dilution zone 122. A second mixing apparatus 120 is coupled to a back pressure regulator, melt pump, or gear pump, 124. An initial amount of water, and a neutralizing agent are added through inlet 110, downstream from the melt blend. In some embodiments, the emulsification zone is operated at a temperature in the range of from 80 to 240° C. In some embodiments, there can be a neutralizing agent reservoir 112 and an initial water reservoir 114, each of which includes a pump. Desired amounts of neutralizing agent (e.g., base) and initial water are provided from the neutralizing agent reservoir 112 and the initial water reservoir 114, respectively. Any suitable pump may be used, but in some embodiments, for example, a pump that provides a flow of about 150 cc/min at a pressure of 240 bar is used to provide the neutralizing agent and the initial water to the second mixing apparatus. In other embodiments, a liquid injection pump provides a flow of 300 cc/min at 200 bar or 600 cc/min at 133 bar. In some embodiments, the neutralizing agent and initial water are preheated in a preheater. In some embodiments, a surfactant can be added to inlet 110 from surfactant reservoir 116. The mixture exiting the emulsification zone 118 is an emulsified mixture/dispersion.

The dispersion is further diluted with additional water (e.g., deionized water, buffered water having a pH of 7 or greater, etc.) from reservoir 126 via inlet 128 of the dilution zone 122 of the second mixing apparatus 120. Typically, the dispersion is diluted to at least 40 percent by weight water in the cooling zone. In various embodiments, the dispersion is diluted to 40 to 80 percent by weight water. In some embodiments, the dispersion is diluted to have from 20 to 80 percent by weight solids content. In addition, the diluted mixture may be diluted any number of times until the desired dilution level is achieved.

Also, in various embodiments, a heat exchanger (not shown) is used to cool the dispersion to less than 80° C. after the dispersion exits the second mixing apparatus 120. The pH of the dispersion is typically 8 to 11.5.

Figure 2:
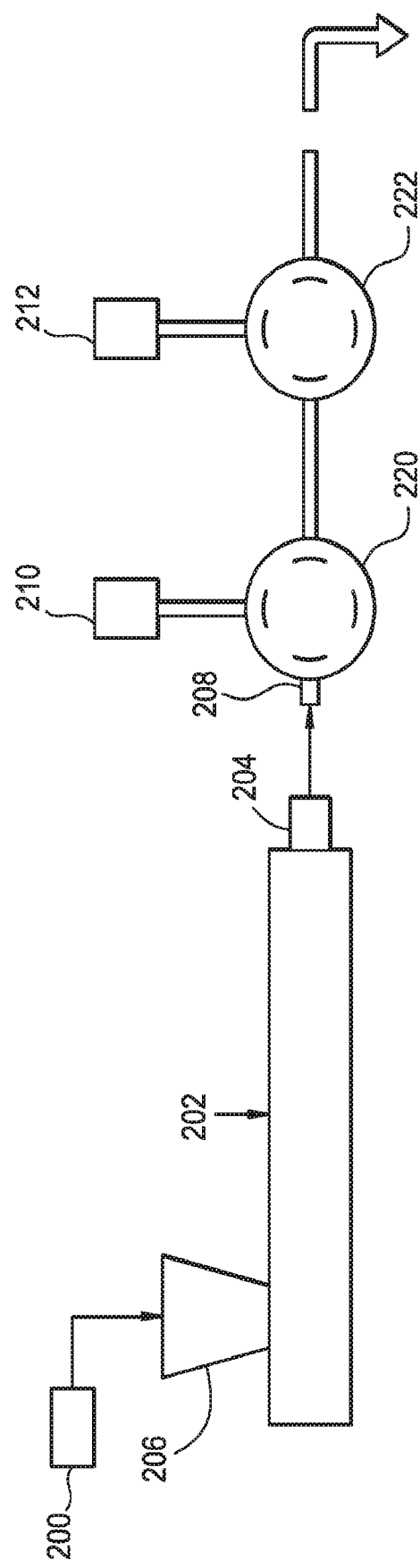
FIG. 2 shows a schematic illustration of an apparatus including a first extruder mixing apparatus and a second rotor stator mixing apparatus used to prepare waterborne heat seal coating compositions according to the disclosure.

FIG. 2 shows a schematic illustration of an apparatus which can be used to prepare the waterborne heat seal coatings of the present disclosure. In FIG. 2, a first mixing apparatus 202, for instance a twin screw extruder in FIG. 2, is coupled to a back pressure regulator, melt pump, or gear pump, 204. In other embodiments, any melt-kneading means known in the art may be used. For instance, in some embodiments, a kneader, a BANBURY® mixer, single-screw extruder, or a multi-screw extruder is used. The thermoplastic polymer, wax, and tackifier are formed or consolidated into a masterbatch, which can be in the shape or form of pellets, powder, or flakes and fed into feeder 200. The first mixing apparatus melts and blends the pellets, powder, or flakes, which are fed from the feeder 200 to an inlet 206 of the first mixing apparatus 202, to form a homogeneous melt blend under the conditions which are typically used for melt-kneading thermoplastic resins. An emulsifying agent may be added with the aforementioned components at inlet 206 and/or at any other point in the first mixing apparatus 202 downstream of inlet 206. The melt blend comprises polymer particles having a volume average particle size from 150 nm to 4,000 nm dispersed in water. All values and subranges from 150 nm to 4,000 nm are included herein and disclosed herein. In some embodiments, the first mixing apparatus is operated at a temperature in the range of from 80 to 240° C.

The melt blend is then delivered from the first mixing apparatus 202 to a second mixing apparatus 220, which is rotor stator mixer in FIG. 2, via an inlet 208 of the second mixing apparatus 220. The rotor stator mixer 220 includes a rotating inner element, or rotor, and a stationary external housing, or stator. The melt blend from the first mixing apparatus 202 is fed into the rotor-stator apparatus through inlet 208, the rotor is capable of rotating at high speeds and mechanically homogenizing/dispersing the melt blend into an initial aqueous feed, together with a neutralizing agent, which is provided from reservoir 210 to form a high-solids content emulsion. In some embodiments, additional emulsifying agent may be added in the second mixing apparatus 220. Subsequently, the high-solids content emulsion is further diluted to a desired solids content with water (e.g., deionized water, buffered water having a pH of 7 or greater, etc.) supplied from a dilution water reservoir 212 in a dilution mixer 222. Typically, the dispersion is diluted to at least 40 percent by weight water in the cooling zone. In various embodiments, the dispersion is diluted to 40 to 80 percent by weight water. In some embodiments, the dispersion is diluted to have from 20 to 80 percent by weight solids content. In addition, the diluted mixture may be diluted any number of times until the desired dilution level is achieved. The process for the second apparatus may be operated at a temperature in the range of from 80 to 180° C. In some embodiments, the rotor stator mixer 220 and the dilution mixer 222 can be combined into a single rotor stator mixing apparatus.

Also, in various embodiments, a heat exchanger (not shown) is used to cool the dispersion to less than 80° C. after the dispersion exits the dilution mixer 222. The pH of the dispersion is typically 8 to 11.5.

FIG. 3 shows a schematic illustration of an apparatus which can be used to prepare the waterborne heat seal coatings of the present disclosure. In FIG. 3, an extruder 302, preferably a twin screw extruder, is coupled to a back pressure regulator, melt pump, or gear pump, 304. In various embodiments, the extruder 302 has three zones: (1) a conveying, melting, and mixing zone 306, (2) an emulsification zone 308, and (3) a dilution zone 310. In various embodiments, the mixing and conveying zone 306 is operated at a temperature in the range of from 80 to 240° C. and the emulsification zone 308 is operated at a temperature in the range of from 80 to 240° C. In some embodiments, conveying, melting, and mixing zone 306 portion of the extruder 302 has a barrel of Length "L" and a diameter of Diameter "D", which provide a length-to-diameter ratio of not less than 12 to 1, such as from 12 to 1 to 60 to 1.

The thermoplastic polymer, wax, and tackifier are formed or consolidated into a masterbatch, which can be in the shape or form of pellets, powder, or flakes and fed into feeder 312. The pellets, powder, or flakes are fed from the feeder 312 to an inlet 314 of the extruder 302 where the components are melted or compounded to form a homogeneous melt blend. The melt blend comprises polymer particles having a volume average particle size from 150 nm to 2,000 nm dispersed in water. All values and subranges from 150 nm to 4,000 nm are included herein and disclosed herein.

The emulsifying agent is also injected into the conveying, melting, and mixing zone 306 of extruder 302, preferably in the latter portion of this zone 306. Other additives can also be added to the extruder via inlet 314. The melt blend is then fed from the conveying, melting, and mixing zone 306 to the emulsification zone 308 of the extruder 302 where an initial amount of water, and a neutralizing agent is added through inlet 316. In some embodiments, there can be a neutralizing agent reservoir 318 and an initial water reservoir 320, each of which includes a pump. Desired amounts of neutralizing agent (e.g., base) and initial water are provided from the base reservoir and the initial water reservoir, respectively. Any suitable pump may be used, but in some embodiments, for example, a pump that provides a flow of about 150 cc/min at a pressure of 240 bar is used to provide the neutralizing agent and the initial water to the extruder. In other embodiments, a liquid injection pump provides a flow of 300 cc/min at 200 bar or 600 cc/min at 133 bar. In some embodiments, the neutralizing agent and initial water are preheated in a preheater. In some embodiments, a surfactant can be added to inlet 316 from surfactant reservoir 322. The mixture exiting the emulsification zone 308 is an emulsified mixture/dispersion.

The emulsified mixture is further diluted with additional water (e.g., deionized water, buffered water having a pH of 7 or greater, etc.) from reservoir 324 via inlet 326 to the dilution and cooling zone 310 of the extruder 302. Typically, the dispersion is diluted to at least 40 weight percent water in the cooling zone. In various embodiments, the dispersion is diluted to 40 to 80 weight percent water. In some embodiments, the dispersion is diluted to have from 20 to 80 percent by weight solids content. In addition, the diluted mixture may be diluted any number of times until the desired dilution level is achieved.

Also, in various embodiments, a heat exchanger (not shown) is used to cool the dispersion to less than 80° C. after the dispersion exits the extruder 302. The pH of the dispersion is typically 8 to 11.5.

EXAMPLES OF THE DISCLOSURE

Sample Preparations

The pertinent raw materials used in the Examples include ELVAX™ 4260 (ethylene vinyl acetate from DuPont), DYMEREX™ rosin (from Eastman), carnauba wax (from Gehring-Montgomery), and paraffin waxes (Paraffin Wax 128/130 and paraffin wax 140/145 (1:1 by weight) from Ross Waxes), as well as oleic acid and potassium hydroxide. The waterborne heat seal coating compositions of the Examples are generally prepared pre-compounding at least the ELVAX™ 4260, DYMEREX™ rosin, carnauba wax, and paraffin waxes in a first mixing apparatus which is a 40-mm twin-screw extruder having a length-to-diameter ratio of 45 to 1. The selected raw materials are melted and blended in the first mixing apparatus to generate a melt blend mixture. The melt blend resulting from the pre-compounding process is a homogenous, molten stream of material that exits the extruder through a die, which in turn is coupled to an underwater pelletizing system. The melt blend is extruded through a die plate and cut into pellets by means of blades installed in a blade hub of the pelletizing system. The cut pellets are cooled to a solid state by means of a cold water flow. Subsequently, the solid pellets are transferred to a spin dryer system that removes any excess of water from the surface of the pellets. Afterwards, the pellets are transferred to a classifier system and vacuum-transferred to the final packaging container.

The pre-compounded material, in the form of pellets, is then fed to a second mixing apparatus, which is a 40 mm twin screw extruder having a length-to-diameter ratio of 44 to 1, to form a melt blend. The extruder had a total of three zones which are, in order: (1) a conveying, melting, and mixing zone, (2) an emulsification zone, and (3) a dilution and cooling zone. The emulsifying agent (oleic acid in the Examples) is injected into the emulsification zone through a single tappet style injector. Dual 500 ml ISCO syringe pumps metered the initial aqueous (IA) stream of deionized water and potassium hydroxide solution (25 weight percent), which was pumped into the emulsification zone of the twin-screw extruder though the same single tappet style injector.

Before running the second mixing apparatus, the extruder barrel and exit zones are heated to the desired temperatures (conveying, melting, and mixing zone heated to between 80 and 160° C., emulsification zone and dilution and cooling zone heated to between 80 and 140° C.). Once the extruder barrel reached the desired temperature, polymer is purged through the extruder. To prevent plugging, the screw is operated at about 300 rpm until the residual polymer from the previous run exits the end valve freely. The feed is then started and the polymer flow is allowed to line out.

The Examples are prepared according to the processes described above and their properties are shown in Table 1. In Table 1, "E" represents ELVAX™ 4260, "D" represents DYMEREX™, "C" represents carnauba wax, "P" represents paraffin wax, and "O" represents oleic acid. Comparative Example 1 is made from ADCOTE™ 37P295 from the Dow Chemical Company, and is made by a batch dispersion process.

Particle size analysis is conducted in a Beckman Coulter LS 13 320 Laser Diffraction Particle Size Analyzer (Beckman Coulter Inc.) using the standard procedure predetermined by the instrument software. Dispersion pH is measured using a Denver Instruments pH meter. Solids content analysis is performed with an OMNIMARK™ moisture analyzer. Dispersion viscosity is measured on a Brookfield rotational viscometer (RV #2 spindle at 50 rpm).

TABLE 1

Properties of Examples

| Example | Illustrative Example 1 | Comparative Example 1 |
|---|---|---|
| Composition | E/D/C/P/O (ratio by weight) 233/47/60/60/2.4 | ADCOTE ™ 37P295 |
| Particle Size Average (μm) | 1.2 | 0.196 |
| Particle Size Mode (μm) | 0.430 | 0.205 |

TABLE 1-continued

Properties of Examples

| Example | Illustrative Example 1 | Comparative Example 1 |
|---|---|---|
| pH | 10.3 | 10.2 |
| Viscosity 1 minute (mPa-s @ 23° C.) (50 RPM RV02) | 93.2 | 54 |
| % solids | 38.6 | 40.3 |

Performance Tests

The primary substrates used in the Examples are a 92 g PET film and a pre-laminated PET-Aluminum film, foil side. The primary substrates are sealed to secondary substrates of a 92 g PET film, a casted PP (3 mils) film, a PVC sheet, a PETG sheet, a Barex sheet (yellow), a paper board (clay coated one side), and a pre-laminated PET-Aluminum foil side. The waterborne heat seal coating composition samples are prepared for the performance tests by coating with a Mayer rod drawdown bar by targeting a dried coating weight of 3 lb/ream. The coated wet films are dried in 90° C. oven for 2 minutes to evaporate water. The actual coating weights for the Examples are as follows: Illustrative Example 1, 2.7 lb/rm coated PET and 3 lb/rm coated foil; Comparative Example 1, 2.8 lb/rm coated PET, 2.9 lb/rm coated foil.

Heat sealing is conducted with a heat sealer with upside heating temperature for the bond strength test of 40 psi, 1.0 sec, different temperature (200 to 350° F.), and an activation temperature of 40 psi, 0.5 sec, 77 to 200° F.

Shelf life stability is tested by keeping the samples at 3° C. (in a refrigerator) and at 40° C. (in an oven) for various periods of time. The shelf life stability of the Examples is summarized in Table 2.

| Time aging (days) | Illustrative Example 1 mPa-s @ 3° C. | Illustrative Example 1 mPa-s @ 45° C. | Comparative Example 1 mPa-s @ 3° C. | Comparative Example 1 mPa-s @ 40° C. |
|---|---|---|---|---|
| 0 | 140 | 140 | 56 | 56 |
| 168 | 140 | 120 | 57 | 323 |
| 336 | 140 | 113 | 58 | 750 |
| 744 | 140 | 102 | 57 | 16,140 |

Block resistance testing is performed using a 1 lb weight at room temperature (about 23° C.) and at 40° C.

Bond strength is measured with a Thwing Albert Instron, using a 1-inch strip, 10 inch/min pulling speed, triplicates samples with average value (g/in) reported.

TABLE 3

Bond Strength Test Results

Coated PET (treated) Seal to PVC

| High value Sample | Mean ~93° C. | ~120° C. |
|---|---|---|
| ADCOTE ™ 37 P295 | 185 | 279 |
| STD | 25 | 8 |
| 40% BLUEWAVE-wax | 300 | 584 |
| STD | 28 | 10 |

Seal to PVC-Y

| Sample | ~93° C. | ~120° C. |
|---|---|---|

TABLE 3-continued

Bond Strength Test Results

| | | |
|---|---|---|
| ADCOTE ™37 P295 | 164 | 193 |
| STD | 23 | 42 |
| 40% BLUEWAVE | 450 | 447 |
| STD | 41 | 163 |

Seal to PETG

| Sample | ~93° C. | ~120° C. |
|---|---|---|
| ADCOTE ™37 P295 | 147 | 177 |
| STD | 15 | 86 |
| 40% BLUEWAVE | 240 | 317 |
| STD | 9 | 64 |

Seal to LDPE

| Sample | ~93° C. | ~120° C. |
|---|---|---|
| ADCOTE ™37 P295 | 114 | 312 |
| STD | 33 | 137 |
| 40% BLUEWAVE | 70 | 401 |
| STD | 15 | 148 |

Seal to Paper board (clay coated)

| Sample | ~93° C. | ~120° C. |
|---|---|---|
| ADCOTE ™37 P295 | 119 | 75 |
| STD | 13 | 7 |
| 40% BLUEWAVE | 146 | 146 |
| STD | 3 | 3 |

Face to face seal

| Sample | ~93° C. | ~120° C. | ~150° C. |
|---|---|---|---|
| ADCOTE ™37 P295 | 210 | 207 | 526 |
| STD | 40 | 25 | 83 |
| 40% BLUEWAVE | 432 | 368 | 582 |
| STD | 148 | 8 | 45 |

Foil to different temp
Seal Al to PVC

| Sample | Mean ~93° C. | ~120° C. |
|---|---|---|
| ADCOTE ™37 P295 | 535 | 456 |
| STD | 25 | 16 |
| 40% BLUEWAVE | 490 | 396 |
| STD | 8 | 50 |

Seal Al to PVC-Y

| Sample | ~93° C. | ~120° C. |
|---|---|---|
| ADCOTE ™37 P295 | 421 | 404 |
| STD | 33 | 15 |
| 40% BLUEWAVE | 454 | 359 |
| STD | 18 | 11 |

Seal Al to PETG

| Sample | ~93° C. | ~120° C. |
|---|---|---|
| ADCOTE ™37 P295 | 488 | 427 |
| STD | 13 | 27 |
| 40% BLUEWAVE | 469 | 428 |
| STD | 4 | 12 |

Seal Al to LDPE

| Sample | ~93° C. | ~120° C. |
|---|---|---|
| ADCOTE ™37 P295 | 445 | 501 |
| STD | 3 | 38 |
| 40% BLUEWAVE | 446 | 445 |
| STD | 8 | 64 |

TABLE 3-continued

Bond Strength Test Results

Seal Al to Paper

| Sample | ~93° C. | ~120° C. |
|---|---|---|
| ADCOTE ™37 P295 | 236 | 210 |
| STD | 2 | 7 |
| 40% BLUEWAVE | 156 | 222 |
| STD | 32 | 78 |

Prelam face to face

| Sample | ~93° C. | ~120° C. | ~150° C. |
|---|---|---|---|
| ADCOTE ™37 P295 | 423 | 392 | 390 |
| STD | 47 | 16 | 16 |
| 40% BLUEWAVE | 487 | 377 | 544 |
| STD | 15 | 7 | 60 |

In addition to the embodiments described above, many embodiments of specific combinations are within the scope of the disclosure, some of which are described below:

Embodiment 1. A method for preparing a waterborne heat seal coating composition, comprising:
 (A) melt blending an ethylene vinyl acetate copolymer, a tackifier, and a wax in a first mixing apparatus to form a melt blend;
 (B) contacting the melt blend with an initial aqueous stream comprising a neutralizing agent, water, and a surfactant in an emulsification zone of the second mixing apparatus to form a dispersion; and
 (C) diluting the dispersion with water in a dilution zone of the second mixing apparatus to form the waterborne heat seal coating composition.

Embodiment 2. The method according to any preceding or succeeding Embodiment, wherein the method is a continuous process.

Embodiment 3. The method according to any preceding or succeeding Embodiment, wherein the first mixing apparatus and/or the second mixing apparatus is an extruder.

Embodiment 4. The method according to any preceding or succeeding Embodiment, wherein the first mixing apparatus and/or the second mixing apparatus is a twin screw extruder.

Embodiment 5. The method according to any preceding or succeeding Embodiment, wherein the first mixing apparatus is an internal batch mixer.

Embodiment 6. The method according to any preceding or succeeding Embodiment, wherein the second mixing apparatus is a rotor stator mixer.

Embodiment 7. The method according to any preceding or succeeding Embodiment, wherein the wax is selected from the group consisting of a paraffin wax, a microcrystalline wax, a high density, low molecular weight polyethylene wax, a polypropylene wax, a thermally degraded wax, a by-product polyethylene wax, a Fischer-Tropsch wax, an oxidized Fischer-Tropsch wax, a functionalized wax, and combinations thereof.

Embodiment 8. The method according to any preceding or succeeding Embodiment, wherein the first mixing apparatus is operated at a temperature in the range of from 120 to 180° C.

Embodiment 9. The method according to any preceding or succeeding Embodiment, wherein the emulsification zone of the second mixing apparatus is operated at a temperature in the range of from 80 to 150° C.

Embodiment 10. The method according to any preceding or succeeding Embodiment, wherein the neutralizing agent is potassium hydroxide.

Embodiment 11. The method according to any preceding or succeeding Embodiment, wherein the surfactant is oleic acid.

Embodiment 12. The method according to any preceding or succeeding Embodiment, wherein the tackifier is a dimerized gum rosin.

Embodiment 13. The method according to any preceding or succeeding Embodiment, wherein the waterborne heat seal coating composition has a degree of neutralization of acid groups in the range of from 25 to 100 mole percent, based on the total acid content of the waterborne heat seal coating composition.

Embodiment 14. The method according to any preceding or succeeding Embodiment, wherein the waterborne heat seal coating composition comprises from 40 to 80 percent by weight water.

Embodiment 15. The method according to any preceding or succeeding Embodiment, wherein the ethylene vinyl acetate is present in an amount in the range of from 50 to 85 percent by weight, and the tackifier is present in an amount in the range of from 6 to 20 percent by weight based, on the total weight of solids in the waterborne heat seal coating composition.

Embodiment 16. A method for preparing a waterborne heat seal coating composition, comprising:
(A) melt blending an ethylene vinyl acetate copolymer, a tackifier, and a wax in a mixing and conveying zone of a mixing apparatus to form a melt blend;
(B) contacting the melt blend with an initial aqueous stream comprising a neutralizing agent, water, and a surfactant in an emulsification zone of the mixing apparatus to form a dispersion; and
(C) diluting the dispersion with water in a dilution zone of the mixing apparatus to form the waterborne heat seal coating composition,
wherein the length-to-diameter ratio of the extruder mixing apparatus is greater than or equal to 12 to 1.

Embodiment 17. The method for preparing a waterborne heat seal coating composition according to any preceding or succeeding Embodiment, wherein the length-to-diameter ratio of the extruder mixing apparatus is from 12 to 1 to 60 to 1.

Embodiment 18. The waterborne heat seal coating composition produced by the method of any preceding or succeeding Embodiment.

What is claimed is:

1. A method for preparing a waterborne heat seal coating composition for use at a heat seal temperature less than 200° F., comprising:
(A) melt blending an ethylene vinyl acetate copolymer, a tackifier, and a wax in a first mixing apparatus to form a melt blend;
(B) contacting the melt blend with an initial aqueous stream comprising a neutralizing agent, water, and a surfactant in an emulsification zone of the second mixing apparatus to form a dispersion; and
(C) diluting the dispersion with water in a dilution zone of the second mixing apparatus to form the waterborne heat seal coating composition.

2. The method according to claim 1, wherein the first mixing apparatus and/or the second mixing apparatus is an extruder.

3. The method according to claim 1, wherein the first mixing apparatus is an internal batch mixer.

4. The method according to claim 1, wherein the second mixing apparatus is a rotor stator mixer.

5. The method according to claim 1, wherein the wax is selected from the group consisting of a paraffin wax, a microcrystalline wax, a high density, low molecular weight polyethylene wax, a polypropylene wax, a thermally degraded wax, a by-product polyethylene wax, a Fischer-Tropsch wax, an oxidized Fischer-Tropsch wax, a functionalized wax, and combinations thereof.

6. The method according to claim 1, wherein the first mixing apparatus is operated at a temperature in the range of from 120 to 180° C.

7. The method according to claim 1, wherein the emulsification zone of the second mixing apparatus is operated at a temperature in the range of from 80 to 150° C.

8. The method according to claim 1, wherein the neutralizing agent is potassium hydroxide.

9. The method according to claim 1, wherein the surfactant is oleic acid.

10. The method according to claim 1, wherein the tackifier is a dimerized gum rosin.

11. The method according to claim 1, wherein the waterborne heat seal coating composition has a degree of neutralization of acid groups in the range of from 25 to 100 mole percent, based on the total acid content of the waterborne heat seal coating composition.

12. The method according to claim 1, wherein the ethylene vinyl acetate is present in an amount in the range of from 50 to 85 percent by weight, and the tackifier is present in an amount in the range of from 6 to 20 percent by weight based, on the total weight of solids in the waterborne heat seal coating composition.

13. A method for preparing a waterborne heat seal coating composition for use at a heat seal temperature less than 200°, comprising:
(A) melt blending an ethylene vinyl acetate copolymer, a tackifier, and a wax in a mixing and conveying zone of a mixing apparatus to form a melt blend;
(B) contacting the melt blend with an initial aqueous stream comprising a neutralizing agent, water, and a surfactant in an emulsification zone of the mixing apparatus to form a dispersion; and
(C) diluting the dispersion with water in a dilution zone of the mixing apparatus to form the waterborne heat seal coating composition,
wherein the length-to-diameter ratio of the extruder mixing apparatus is greater than or equal to 12 to 1.

14. The method according to claim 13, wherein the length-to-diameter ratio of the extruder mixing apparatus is from 12 to 1 to 60 to 1.

15. The waterborne heat seal coating composition produced by the method of claim 1.

* * * * *